(12) United States Patent
Ren et al.

(10) Patent No.: US 8,479,500 B2
(45) Date of Patent: Jul. 9, 2013

(54) EXHAUST TREATMENT SYSTEM FOR AN INTERNAL COMBUSTION ENGINE

(75) Inventors: Shouxian Ren, Ypsilanti, MI (US); Rahul Mital, Rochester Hills, MI (US); Jason Daniel Mullins, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 279 days.

(21) Appl. No.: 13/083,024

(22) Filed: Apr. 8, 2011

(65) Prior Publication Data

US 2012/0258015 A1    Oct. 11, 2012

(51) Int. Cl.
*B01D 50/00* (2006.01)
*F01N 3/00* (2006.01)
*F01N 3/10* (2006.01)

(52) U.S. Cl.
USPC .................. 60/297; 60/285; 60/286; 422/169

(58) Field of Classification Search
USPC ..................... 422/169, 172; 60/285, 286, 297
See application file for complete search history.

(56) References Cited

U.S. PATENT DOCUMENTS

| 7,874,147 B2* | 1/2011 | Khadiya | 60/286 |
| 2010/0139248 A1* | 6/2010 | Najt et al. | 60/285 |
| 2010/0242447 A1* | 9/2010 | Jasinkiewicz | 60/286 |
| 2011/0011068 A1* | 1/2011 | Ren et al. | 60/297 |
| 2011/0258992 A1* | 10/2011 | Gonze et al. | 60/297 |

\* cited by examiner

*Primary Examiner* — Tom Duong
(74) *Attorney, Agent, or Firm* — Cantor Colburn LLP

(57) ABSTRACT

An exhaust system for an engine comprises a selective catalytic reduction ("SCR") device having a $NO_x$ reducing selective catalytic reduction composition disposed thereon. A particulate filter is disposed in the rigid shell or canister downstream of the selective catalytic reduction device. An ammonia dosing system comprising a controller in signal communication with $NO_x$ sensors located upstream and downstream of the selective catalytic reduction device for injection of ammonia into the exhaust gas upstream of the SCR device based on information collected from the $NO_x$ sensors to thereby optimize the reduction of $NO_x$ in the exhaust gas. An ammonia-neutral oxidation catalyst compound is disposed on the wall-flow substrate of the particulate filter device and is configured to pass through ammonia constituents of the exhaust gas exiting the selective catalytic reduction device with little or no conversion of the ammonia constituents to N2, N2O and $NO_x$.

11 Claims, 2 Drawing Sheets

EXHAUST TREATMENT SYSTEM FOR AN INTERNAL COMBUSTION ENGINE

FIELD OF THE INVENTION

Exemplary embodiments of the present invention relate to exhaust gas treatment systems for internal combustion engines and, more particularly, to an efficient system for monitoring the NOx conversion efficiency of catalytic treatment devices.

BACKGROUND

The exhaust gas emitted from an internal combustion engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter. Catalyst compositions, typically disposed on catalyst supports or substrates that are disposed within the exhaust system of an internal combustion engine are provided to convert certain or all of these exhaust gas constituents into non-regulated exhaust gas components. For example, exhaust systems for internal combustion engines may include one or more of a precious metal containing oxidation catalyst ("OC") device for the reduction of CO and excess HC, a selective catalytic reduction catalyst ("SCR") device for the reduction of $NO_x$ and a particulate filter ("PF") device for the removal of particulate matter.

An exhaust gas treatment technology in use for high levels of particulate matter reduction, the PF device may utilize one of several known exhaust gas filter structures that have displayed effectiveness in removing the particulate matter from the exhaust gas. Such exhaust gas filter structures may include, but are not limited to ceramic honeycomb wall flow filters, wound or packed fiber filters, open cell foams, sintered metal fibers, etc. Ceramic wall flow filters have experienced significant acceptance in automotive applications.

The exhaust gas filter structure is a physical structure for removing particulates from exhaust gas and, as a result, the accumulation of filtered particulates in the exhaust gas filter structure will have the effect of increasing backpressure in the exhaust system that is experienced by, and that must be overcome by, the internal combustion engine. To address backpressure increases caused by the accumulation of exhaust gas particulates in the exhaust gas filter structure, the PF device is periodically cleaned, or regenerated. Regeneration of a PF device in vehicle applications is typically automatic and is controlled by an engine or other suitable controller based on signals generated by engine and exhaust system sensors. The regeneration event involves increasing the temperature of the exhaust gas filter structure of the PF device, typically by heating the engine exhaust gas, to levels that are often above 600° C. in order to burn the accumulated particulates.

One method of generating the exhaust gas temperatures required in the exhaust system for regeneration of exhaust gas filter structure of the PF device is to deliver unburned HC to an OC device disposed upstream of the PF device or to an oxidation catalyst compound disposed in the PF device itself. The HC may be delivered to the exhaust system by direct fuel injection into the exhaust system or may be achieved by "over-fueling of" or "late injection of fuel to" the internal combustion engine. The result is unburned HC mixed with the exhaust gas flowing through the exhaust system that is oxidized by the oxidation catalyst in an exothermic reaction that raises the temperature of the exhaust gas. The heated exhaust gas burns the particulate accumulation in the exhaust gas filter structure of the PF device. The addition of an oxidation catalyst to the exhaust gas filter structure can assist in lowering the oxidation temperature of soot and particulates and thus the regeneration temperatures required. This results in increased durability of the PF device and lower HC requirements for regeneration and, therefore, improved fuel economy for the internal combustion engine. In addition, such an oxidation catalyst applied to the exhaust gas filter structure of the PF device is useful to oxidize any remaining excess HC in the exhaust gas as well as reducing carbon monoxide constituents ("CO") resulting for the combustion of soot and particulates.

A technology that has been developed to reduce the levels of $NO_x$ emissions in exhaust gas produced by internal combustion engines that burn fuel in excess oxygen includes a selective catalytic reduction ("SCR") device. An SCR catalyst composition in the SCR device preferably contains a zeolite and one or more base metal components such as iron ("Fe"), cobalt ("Co"), copper ("Cu") or vanadium ("V") which can operate efficiently to convert $NO_x$ constituents in the exhaust gas in the presence of a reductant such as ammonia ('$NH_3$"). NOx sensors placed at locations upstream and downstream of the SCR device monitor NOx conversion efficiency and information supplied by the sensors is utilized by a reductant control system to determine the quantity of $NH_3$ to be injected into the exhaust system for use by the SCR device.

For exhaust treatment systems utilized particularly in vehicular applications, space, cost and performance requirements have, at times, necessitated the placement of one or more exhaust treatment devices in a single canister or housing. For instance, an SCR device and a PF device may be housed together. In certain situations such as Chassis Certification the SCR device is preferably placed upstream of the PF device in order to reduce the thermal inertia ahead of the SCR so that it can be warmed up rapidly to start NOx reduction as soon as possible. However, the addition of an oxidation catalyst to the exhaust gas filter structure can result in the conversion of excess $NH_3$ exiting the SCR device into $NO_x$ resulting in a misleading or unreliable $NO_x$ sensor reading by the downstream $NO_x$ sensor. Such a reading may result in improper dosing of $NH_3$ by the reductant control system (e.g. the NOx sensor on sensing high NOx (coming from $NH_3$ oxidation) will command for more $NH_3$). This will result in even higher $NH_3$ slip and so forth. Additionally, $NH_3$ is an unregulated gas and its oxidation to a regulated gas like $NO_x$ is an undesirable feature of an oxidative PF device. One solution for this problem is to locate the downstream $NO_x$ sensor in the space between the substrates of the SCR device and the PF device utilizing a snorkel device that extends into the space and diverts a portion of the exhaust gas exiting the SCR device to a $NO_x$ sensor. However, due to uneven distribution of $NH_3$ and NOx concentrations across the exiting face of the SCR device, as well as the limited packaging space between the two substrates, it is difficult to obtain an accurate and reliable $NO_x$ reading that is representative of the exhaust gas exiting the SCR device across its entire exit cross section.

SUMMARY OF THE INVENTION

In an exemplary embodiment of the invention, an exhaust gas after treatment system for an internal combustion engine comprises an exhaust gas conduit in fluid communication with, and configured to receive an exhaust gas from the engine. A selective catalytic reduction device comprising a flow-through substrate packaged in a rigid canister has an inlet and an outlet in fluid communication with exhaust gas in the exhaust gas conduit. A selective catalytic reduction composition is disposed on the flow-through substrate for reduction of oxides of nitrogen ("$NO_x$") in the exhaust gas in the presence of an ammonia reductant. A particulate filter device having a wall-flow substrate configured to filter the exhaust gas of carbon and other particulates is disposed in the rigid canister, downstream of the selective catalytic reduction device. An ammonia dosing system comprising a controller in signal communication with a $NO_x$ sensor located upstream of the selective catalytic reduction device and a $NO_x$ sensor located downstream of the particulate filter device is configured to inject ammonia into the exhaust gas upstream of the selective catalytic reduction device based on information collected by the controller from the upstream and the downstream $NO_x$ sensors to thereby optimize the reduction of $NO_x$ in the exhaust gas. An ammonia-neutral oxidation catalyst compound, that is substantially un-reactive with respect to ammonia in the exhaust gas, is dispersed into the wall-flow substrate of the particulate filter device and is configured to pass-through ammonia constituents of the exhaust gas exiting the selective catalytic reduction device with little or no conversion of the ammonia constituents to N2, N2O and $NO_x$.

In another exemplary embodiment of the invention, an exhaust gas treatment device for an exhaust gas treatment system of an internal combustion engine comprises a selective catalytic reduction device having a flow-through substrate packaged in a rigid canister having an inlet and an outlet for fluid communication with an exhaust gas in the exhaust gas treatment system. A selective catalytic reduction composition is disposed on the flow-through substrate for the reduction of oxides of nitrogen ("$NO_x$") in the exhaust gas in the presence of an ammonia reductant. A particulate filter device having a wall-flow substrate is configured to filter the exhaust gas of carbon and other particulates disposed in the rigid canister downstream of the selective catalytic reduction device. A $NO_x$ sensor located upstream of the selective catalytic reduction device and a $NO_x$ sensor located downstream of the particulate filter device are configured to measure levels of $NO_x$ in the exhaust gas and an ammonia-neutral oxidation catalyst compound, that is substantially un-reactive with respect to ammonia in the exhaust gas, is disposed into the wall-flow substrate of the particulate filter device and is configured to pass-through ammonia constituents of the exhaust gas exiting the selective catalytic reduction device with little or no conversion of the ammonia constituents to N2, N2O and $NO_x$.

The above features and advantages, and other features and advantages of the present invention are readily apparent from the following detailed description of the invention when taken in connection with the accompanying figure.

BRIEF DESCRIPTION OF THE DRAWINGS

Other objects, features, advantages and details appear, by way of example only, in the following detailed description of the embodiments, the detailed description referring to the figures in which.

DESCRIPTION OF THE EMBODIMENTS

Figure 1:
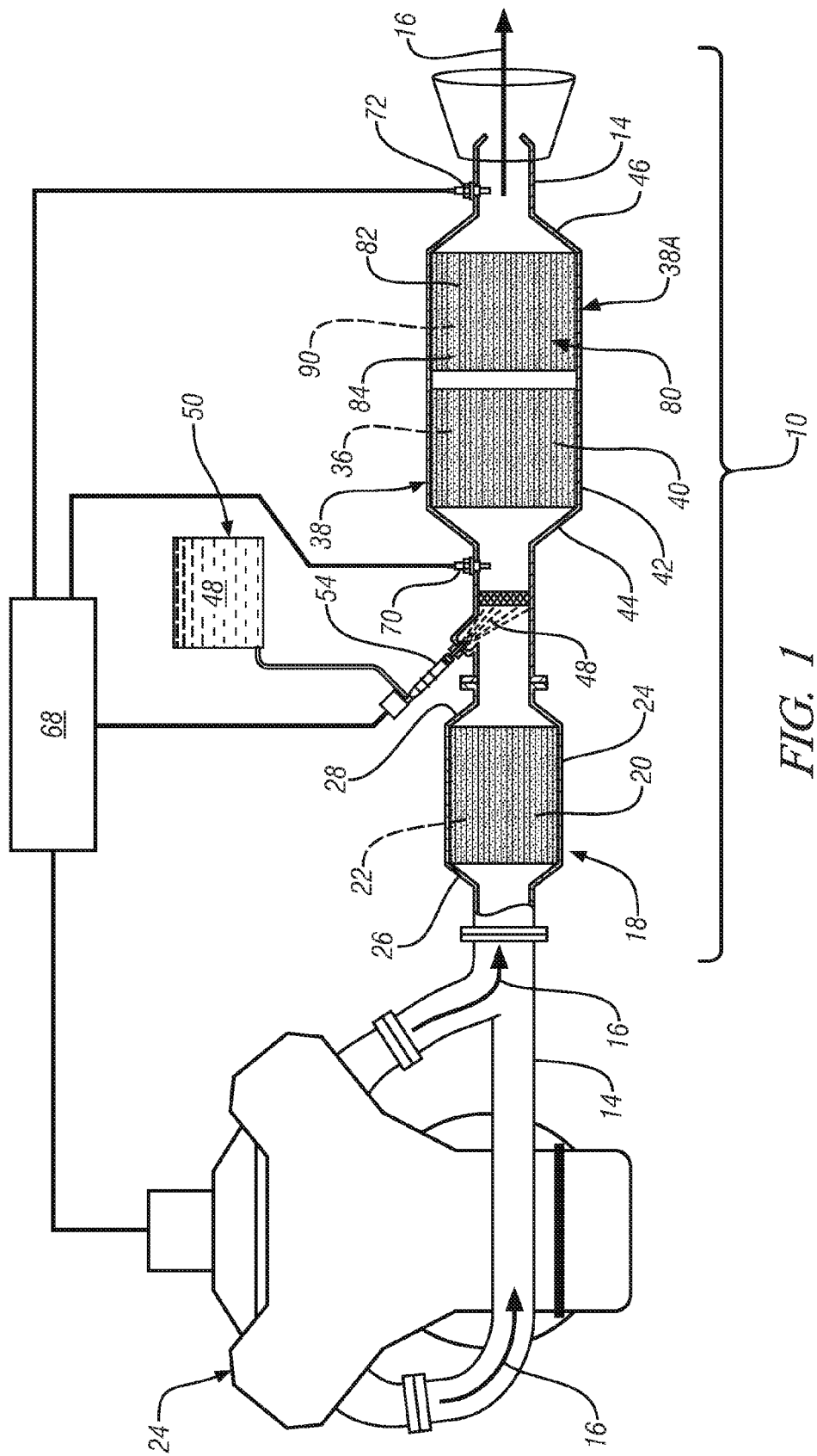
FIG. 1 is a schematic view of an exhaust gas treatment system for an internal combustion engine.

The following description is merely exemplary in nature and is not intended to limit the present disclosure, its application or uses. It should be understood that throughout the drawings, corresponding reference numerals indicate like or corresponding parts and features.

Referring now to the Figure, an exemplary embodiment of the invention is directed to an exhaust gas treatment system 10, for the reduction of regulated exhaust gas constituents of an internal combustion engine 12. It is appreciated that the internal combustion engine 12 may include, but is not limited to diesel engine systems, gasoline engine systems and variations thereof.

The exhaust gas treatment system 10 includes an exhaust gas conduit 14, which may comprise several segments that function to transport exhaust gas 16 from the internal combustion engine 12 to various exhaust treatment devices (to be described) of the exhaust gas treatment system 10. The exhaust treatment devices may include one or more oxidation catalyst ("OC") devices 18. In an exemplary embodiment, the OC device 18 includes a flow-through metal or ceramic monolith substrate ("substrate") 20 that is packaged in a rigid canister 24 between an inlet 26 and an outlet 28 that are in fluid communication with exhaust gas conduit 14 and configured to facilitate the flow of exhaust gas 16 therethrough. The substrate 20 has an oxidation catalyst compound 22 disposed thereon. The oxidation catalyst compound may be applied as a wash coat and may contain platinum group metals such as platinum (Pt), palladium (Pd), rhodium (Rh) or other suitable oxidizing catalysts such as base metals, or combination thereof. The OC device 18 is generally useful in treating unburned gaseous and non-volatile HC and CO emitted from the engine as part of the exhaust gas 16 and which are oxidized to form carbon dioxide and water. Additionally the OC device 18 may be an important component in the exhaust treatment system for oxidizing HC and CO to generate enough heat to burn off accumulated soot in a particulate filter during a regeneration of a PF device.

In an exemplary embodiment, an exhaust treatment device comprising a selective catalytic reduction ("SCR") device 38 is disposed downstream of the OC device 18. In a manner similar to the OC device, the SCR device 38 may include a flow-through ceramic or metal monolith substrate ("substrate") 40 that is packaged in a rigid canister 42 having an inlet 44 and an outlet 46 in fluid communication with exhaust gas conduit 14 and configured to facilitate the flow of exhaust gas 16 therethrough. The substrate 40 has an SCR catalyst composition 36 applied thereto. The SCR catalyst composition preferably contains a zeolite and one or more base metal components such as iron ("Fe"), cobalt ("Co") or copper ("Cu") which can operate efficiently to convert oxides of nitrogen ("$NO_x$") constituents in the exhaust gas 16 in the presence of a reductant such as ammonia ("$NH_3$"). In addition the SCR catalyst can be Vanadia/Titania based, Platinum based or a combination thereof. Other Vanadia free formulations (e.g. Acidic Zirconia) may also be used.

In an exemplary embodiment, the $NH_3$ reductant 48 may be supplied by an ammonia dosing system including a reductant supply tank 50 that is in fluid communication with a reductant injector 54. The reductant injector 54 injects the ammonia reductant 48 into the exhaust gas conduit 14, for mixing with the exhaust gas 16, at a location upstream of the SCR device 38. The reductant 48 may be in the form of a gas, a liquid or an aqueous urea solution and may be mixed with air in the reductant injector 54 to aid in the dispersion of the injected spray. A controller such as a powertrain or a vehicle controller 68 is operably connected to, and monitors, the exhaust gas treatment system 10 through signal communication with a number of sensors such as upstream and downstream $NO_x$ sensors 70 and 72, respectively. The NOx sensors monitor the levels of NOx near the inlet 44 and the outlet 46 of the rigid canister 42 and determine, through information gathered from the sensors, the appropriate $NH_3$ reductant dosing required by the SCR device 38 for optimal performance. The controller 68 may operates as part of the reductant control system and adjusts the operation of the reductant injector 54 during operation of the internal combustion engine 12 and, based on the described information gathered from the sensors 70, 72. As used herein the term controller may include an application specific integrated circuit (ASIC), an electronic circuit, a processor (shared, dedicated or group) and memory that executes one or more software or firmware programs, a combinational logic circuit, and/or other suitable components that provide the described functionality.

Figure 2:
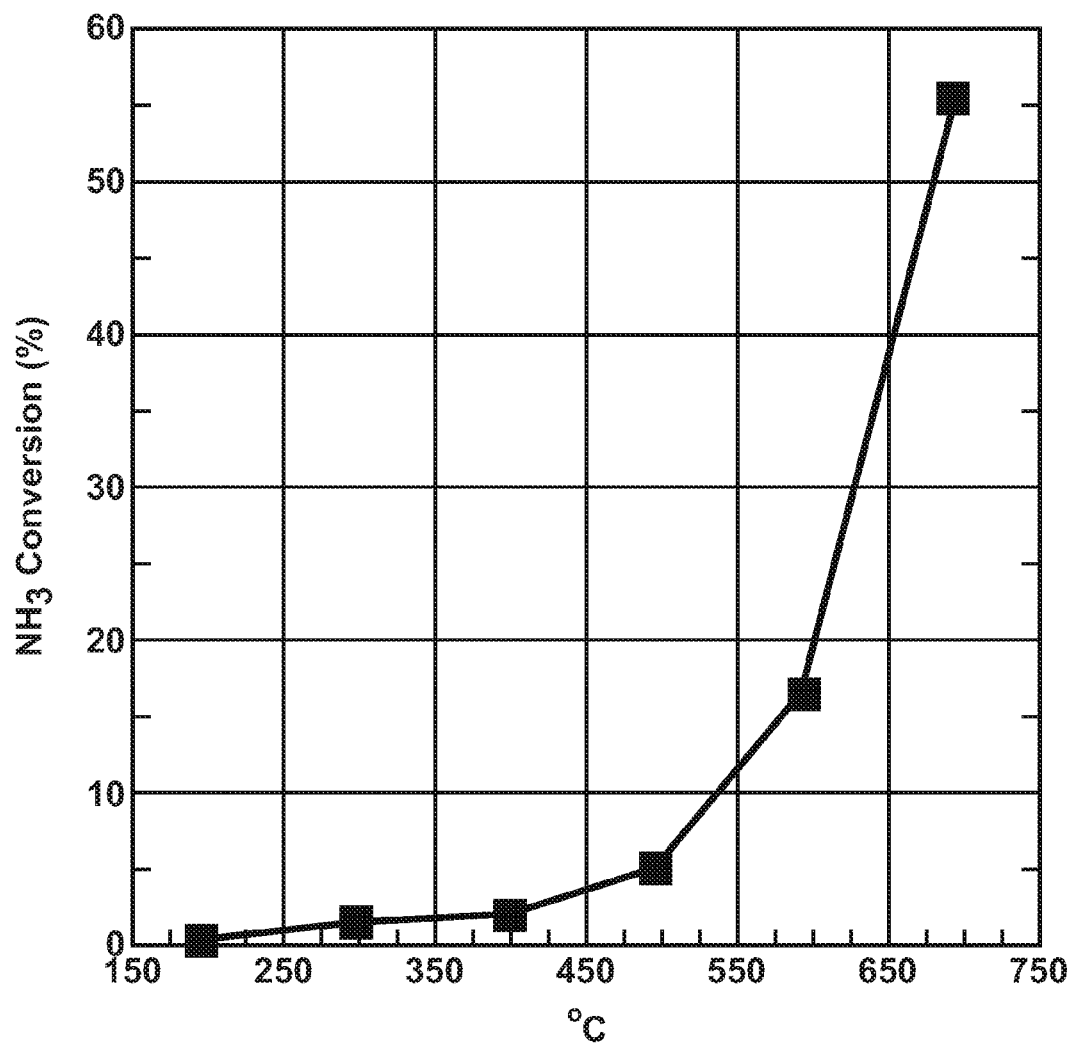
FIG. 2 is a testing plot representing the performance of an ammonia neutral catalyst.

In an exemplary embodiment, the SCR device 38 may be commonly housed with a particulate filter ("PF") device 38A that operates to filter the exhaust gas 16 of carbon and other particulates. The PF device 38A may be constructed using a ceramic wall flow monolith filter substrate ("substrate") 80 that is packaged in the rigid canister 42 downstream of the SCR device 38. The ceramic wall flow monolith filter 80 has a plurality of longitudinally extending passages 82 that are defined by longitudinally extending walls 84. The longitudinally extending passages 82 include a subset of inlet passages (not shown) that have an open inlet end and a closed outlet end, and a subset of outlet passages (not shown) that have a closed inlet end and an open outlet end. Exhaust gas 16 entering the PF device 38A through the open inlet ends of the inlet passages is forced to migrate through adjacent longitudinally extending walls 84 to the outlet passages as is known in the art. It is through this wall flow mechanism that the exhaust gas 16 is filtered of carbon and other particulates. The filtered particulates are deposited on the longitudinally extending walls 84 of the inlet passages and, over time, will have the effect of increasing the exhaust gas backpressure experienced by the internal combustion engine 12. It is appreciated that the ceramic wall flow monolith filter 80 is merely exemplary in nature and that the PF device 38A may include other filter devices such as wound or packed fiber filters, open cell foams, sintered metal fibers, etc. In an exemplary embodiment, the ceramic wall flow monolith filter 80 of the PF device 38A includes an oxidation catalyst composition 90 dispersed therein. The addition of the oxidation catalyst composition 90 to the PF device 38A results in a 2-way exhaust treatment device that is capable of reducing regulated components of the exhaust gas 16 as well as removing carbon and other particulates. The oxidation catalyst compound 90 is preferably a "$NH_3$ neutral" oxidation catalyst compound that is substantially unreactive with respect to $NH_3$ in the exhaust gas 16. Specifically, the oxidation catalyst compound 90 does not react with $NH_3$, that is resident in the exhaust gas 16 downstream of the SCR device 38, thereby resulting in little or no ammonia oxidation when the operating temperature of the PF device 38A is less than 425° C. and little formation of $NO_x$ exiting the PF device 38A when the operating temperature of the PF device 38A is greater than 425° C., FIG. 2. In an exemplary embodiment the "$NH_3$ neutral" oxidation catalyst is a non-Platinum ("Non-Pt") catalyst, that may include Palladium ("Pd"), base metals (Ce, Cu, Mo, Fe, Mn, La etc.), Alkali metals (Na, K) or combinations thereof.

The "$NH_3$ neutral" oxidation catalyst compound 90 functions to beneficially oxidize HC and CO in the PF device 38A into non-regulated constituents without affecting the $NO_x$ levels that are sensed by the downstream $NO_x$ sensor 72. As a result the information collected by the controller 68 accurately represents the level of $NO_x$ exiting the SCR device 38, but after the exhaust gas 16 has passed through the PF device 38A. As a result, $NH_3$ dosing upstream of the SCR device 38 is optimized based only on the performance of the SCR device 38. In addition, by oxidizing the HC and CO the "$NH_3$ neutral" oxidation catalyst compound substantially reduces white smoke and odor during a DPF regeneration process.

In another exemplary embodiment, the ceramic wall flow monolith filter 80 of the PF device 38A may dispense with a catalyst composition. The un-catalyzed wall flow ceramic substrate is, by nature, "$NH_3$ neutral" and the exhaust gas 16 may pass through the PF device 38A $NO_x$ levels that are sensed by the downstream $NO_x$ sensor 72 being compromised. As a result the information collected by the controller 68 accurately represents the levels of $NO_x$ exiting the SCR device 38 after the exhaust gas 16 has passed through the PF device 38A and $NH_3$ dosing upstream of the SCR device 38 is, as a result, optimized based only on the performance of the SCR device 38.

While the invention has been illustrated as having a SCR device and a PF device in a single rigid shell or canister with the NOx sensor downstream of SCR it is recognized that having a $NH_3$ neutral PF device is beneficial as it will not function to convert any $NH_3$ (i.e. ammonia slip) into $NO_x$. While the controller minimizes $NH_3$ slip through the feedback from the $NO_x$ sensors, sometimes during certain maneuvers (e.g. rapid acceleration) there may be some level of $NH_3$ slip. In such instance it is undesirable for the $NH_3$ slip to convert to $NO_x$ and interfere with the $NO_x$ conversion efficiency of the exhaust treatment system.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An exhaust gas treatment system for an internal combustion engine comprising:

an exhaust gas conduit in fluid communication with, and configured to receive an exhaust gas from the internal combustion engine;

a selective catalytic reduction device comprising a flow-through substrate packaged in a rigid canister having an inlet and an outlet in fluid communication with the exhaust gas in the exhaust gas conduit;

a selective catalytic reduction composition disposed on the flow-through substrate for reduction of oxides of nitrogen ("$NO_x$") in the exhaust gas in the presence of an ammonia reductant;

a particulate filter device having a wall-flow substrate configured to filter the exhaust gas of carbon and other particulates disposed in the rigid canister downstream of the selective catalytic reduction device;

a dosing system comprising a controller in signal communication with a $NO_x$ sensor located upstream of the selective catalytic reduction device and a $NO_x$ sensor located downstream of the particulate filter device and configured to inject ammonia into the exhaust gas upstream of the selective catalytic reduction device based on information collected by the controller from the upstream and the downstream $NO_x$ sensors to thereby optimize the reduction of $NO_x$ therein; and an ammonia-neutral oxidation catalyst compound, that is substantially un-reactive with respect to ammonia in the exhaust gas, is dispersed into the wall-flow substrate of the particulate filter device and configured to pass-through ammonia constituents of the exhaust gas exiting the selective catalytic reduction device such that little or none of the ammonia is converted to $NO_x$.

2. The exhaust gas treatment system of claim 1, wherein the selective catalytic reduction composition comprises a zeolite and one or more base metal components such as iron ("Fe"), copper ("Cu") or a combination thereof.

3. The exhaust gas treatment system of claim 1, wherein the selective catalytic reduction composition is Vanadia/Titania based, Platinum based or a combination thereof.

4. The exhaust gas treatment system of claim 1, wherein the ammonia dosing system further comprises:
   a reductant supply tank; and
   a reductant injector, in fluid communication with the reductant supply tank and the controller, configured to inject reductant into the exhaust gas conduit for mixing with the exhaust gas, the reductant injector being at a location upstream of the selective catalytic reduction device.

5. The exhaust gas treatment system of claim 1, wherein the ammonia-neutral oxidation catalyst compound comprises Palladium ("Pd"), base metals (ex., Ce, Cu, Mo, Fe, Mn, La, etc.), Alkali metals (Na, K), or a combination thereof.

6. The exhaust gas treatment system of claim 5, wherein the ammonia-neutral oxidation catalyst compound oxidizes HC and CO in the particulate filter device.

7. An exhaust gas treatment device for an exhaust gas treatment system of an internal combustion engine comprising:
   a selective catalytic reduction device comprising a flow-through substrate packaged in a rigid canister having an inlet and an outlet for fluid communication with an exhaust gas in the exhaust gas treatment system;
   a selective catalytic reduction composition disposed on the flow-through substrate for reduction of oxides of nitrogen ("$NO_x$") in the exhaust gas in the presence of an ammonia reductant;
   a particulate filter device having a wall-flow substrate configured to filter the exhaust gas of carbon and other particulates disposed in the rigid canister, downstream of the selective catalytic reduction device;
   a $NO_x$ sensor located upstream of the selective catalytic reduction device and a $NO_x$ sensor located downstream of the particulate filter device and configured to measure levels of $NO_x$ in the exhaust gas; and
   an ammonia-neutral oxidation catalyst compound, that is substantially un-reactive with respect to ammonia in the exhaust gas, disposed on the wall-flow monolith substrate of the particulate filter device and configured to pass-through ammonia constituents of the exhaust gas exiting the selective catalytic reduction device with little or no conversion of the ammonia constituents to N2, N2O and $NO_x$.

8. The exhaust gas treatment device of claim 7, wherein the selective catalytic reduction composition comprises a zeolite and one or more base metal components such as such as iron ("Fe"), copper ("Cu") or a combination thereof.

9. The exhaust gas treatment system of claim 8, wherein the ammonia-neutral oxidation catalyst compound is configured to oxidize HC and CO in the particulate filter device and to reduce white smoke and odor during a PF regeneration process.

10. The exhaust gas treatment system of claim 7, wherein the selective catalytic reduction composition is Vanadia/Titania based, Platinum based or a combination thereof.

11. The exhaust gas treatment system of claim 7, wherein the ammonia-neutral oxidation catalyst compound comprises Palladium ("Pd"), base metals (Ce, Cu, Mo, Fe, Mn, etc.), Alkali metals (Na, K), or a combination thereof.

* * * * *